(12) United States Patent
Primot et al.

(10) Patent No.: US 7,406,767 B2
(45) Date of Patent: Aug. 5, 2008

(54) METHOD FOR MAKING A SECTION OF A SUPPORT STRUT MEMBER OF AN OFFSHORE OIL-DRILLING RIG

(75) Inventors: Louis Primot, La Baule (FR); Pierre-Armand Thomas, Puteaux (FR)

(73) Assignee: Technip France (FR)

( * ) Notice: Subject to any disclaimer, the term of this patent is extended or adjusted under 35 U.S.C. 154(b) by 646 days.

(21) Appl. No.: 10/520,102

(22) PCT Filed: Jun. 11, 2003

(86) PCT No.: PCT/FR03/01750

§ 371 (c)(1), (2), (4) Date: Apr. 27, 2005

(87) PCT Pub. No.: WO2004/004959

PCT Pub. Date: Jan. 15, 2004

(65) Prior Publication Data

US 2005/0226689 A1    Oct. 13, 2005

(30) Foreign Application Priority Data

Jul. 4, 2002    (FR) .................................. 02 08397

(51) Int. Cl.
*B21D 47/00* (2006.01)
*B21D 39/00* (2006.01)
*E02B 17/08* (2006.01)
*B23K 15/00* (2006.01)

(52) U.S. Cl. ............... 29/897.31; 405/198; 219/121.14; 228/171

(58) Field of Classification Search .............. 29/897.31; 228/159, 161, 165, 169–172, 258; 219/121.14; 405/198, 196
See application file for complete search history.

(56) References Cited

U.S. PATENT DOCUMENTS 2,916,600 A * 12/1959 Tichler ........................ 219/74

(Continued)

FOREIGN PATENT DOCUMENTS

DE    945585    7/1956

(Continued)

OTHER PUBLICATIONS

International Search Report dated Oct. 9, 2003.

*Primary Examiner*—David P. Bryant
*Assistant Examiner*—Alexander P Taousakis
(74) *Attorney, Agent, or Firm*—Ostrolenk, Faber, Gerb & Soffen, LLP

(57) ABSTRACT

The invention concerns a method for making a section of a support strut member of an offshore oil-drilling rig comprising steps which consist in: a) machining each longitudinal edge of a semi-cylindrical stiffener (13) to provide along the longitudinal edge, a lip (18) for support on a main surface (12A) of a main plate (12), by producing along the longitudinal edge an outer bevel (20) on the side opposite the conduit (17) defined by the stiffener (13); b) applying a base plate (22) of the support lip (18) to weld it with main surface (12A) of the plate (12); heating the support lip (18) to weld it with the plate (12) and constitute a support weld joint; and d) forming a weld bead with filler metal from outside the conduit (17) in the space delimited between the support weld joint, the outer bevel (20) and the main surface (12A) of the main plate (12).

13 Claims, 7 Drawing Sheets

U.S. PATENT DOCUMENTS

| | | | | |
|---|---|---|---|---|
| 3,967,457 A | * | 7/1976 | Lovie | 405/198 |
| 4,038,514 A | * | 7/1977 | Ashton | 219/126 |
| 5,607,259 A | | 3/1997 | Thomas et al. | |
| 6,386,427 B2 | * | 5/2002 | Iwago et al. | 228/164 |

FOREIGN PATENT DOCUMENTS

| | | |
|---|---|---|
| EP | 0855241 | 7/1998 |
| FR | 2807682 | 10/2001 |

\* cited by examiner

METHOD FOR MAKING A SECTION OF A SUPPORT STRUT MEMBER OF AN OFFSHORE OIL-DRILLING RIG

The present invention concerns a fabrication process for an offshore oil production platform support leg member.

Oil platforms and jack-up platforms, in particular, feature legs that bear on the seabed and a hull mounted such that it can move and be adjusted in height on the support legs.

The whole platform is floated out to the drilling or production site and the legs are lowered into contact with the seabed then, by bearing on the legs, the hull is raised above sea level up to an elevation that places it outside the range of the highest waves.

Each support leg is made up of vertical members, for example three, interconnected by a lattice of metal struts.

Each member is made up of sections welded end to end, each formed, on the one hand, by a rectangular main plate and, on the other hand, by semicylindrical stiffeners in the shape of half-shells, each welded onto one of the main surfaces of said main plate.

Generally, the length of each section is between 12 and 35 meters.

The lateral edges of the main plates incorporate teeth, which, over part of the length of the members, form diametrically opposite racks designed to operate jointly with the output gears of drive mechanisms mounted on the platform hull.

The length of each stiffener welded onto one of the main surfaces of the rectangular plates is shorter than the length of a plate to provide an open space at each end of the plate to allow sections to be welded end to end, when the member is assembled.

To ensure stiffener continuity, a connection piece in the form of a half-shell with a profile corresponding to the stiffener profile is inserted at each open space in extension to the stiffeners, after welding the member sections end to end.

This arrangement allows previously shop-fabricated sections of the member to be joined end to end and welded directly on site.

A process for fabricating the members and, in particular, a process for welding the stiffeners onto the main plates of the members is described in document FR-2 719 611.

The members, which support the platform hull, are subjected to high fatigue stresses, and the weld beads, in particular those joining the stiffeners to the main plates, are also highly stressed.

The object of the invention is to propose a fabrication process, which enables the structural and corrosion fatigue strengths of the longitudinal welds to be increased at the lowest possible cost.

To this end, the subject of the invention is a fabrication process for a section of an offshore oil production platform support leg member, the member comprising a main plate incorporating, on at least one longitudinal edge, teeth forming a rack and at least one stiffener of semicylindrical shape welded onto a main surface of the main plate along two longitudinal edges, the stiffener and the plate delimiting a conduit, characterized in that it includes the following stages applied to at least one part of the length of the member:

a) machining of each longitudinal edge of the stiffener to form, along the longitudinal edge, a lip for bearing against the main surface of the main plate by forming, along the longitudinal edge, an external bevel on the side opposite the conduit;

b) applying a sole of the bearing lip to the main surface of the plate;

c) heating the bearing lip to ensure its welding to the plate and to form a bearing weld; and d) with filler metal, forming a weld bead from outside the conduit within the space defined between the bearing weld, the external bevel and the main surface of the main plate.

Depending on particular implementation methods, the process has one or several of the following features:

heat supply to cause heating of the bearing lip for the purpose of welding it to the plate is ensured from inside the conduit;

heating of the bearing lip to ensure its welding to the plate is performed without introducing filler metal;

heating of the bearing lip to ensure its welding to the plate is performed using an inert gas nonconsumable-electrode arc welding method;

it includes a stage, applied to at least one part of the length of the member, involving machining of each longitudinal edge of the stiffener to form an internal bevel on this edge, on the side of the bearing lip facing the conduit;

the weld bead formed from outside the conduit fills completely the space defined between the main surface of the plate, the external bevel and the bearing lip;

the bearing lip is incorporated within the half of the stiffener thickness situated on the internal conduit side;

the distance separating the stiffener internal lateral surface, defined on the conduit side, from the bearing lip is between 20 and 40% of the stiffener thickness;

the bearing lip features an internal lateral projection on the conduit side near to its sole;

the minimum height of the projection is between 0 and 8 mm;

a hollow profile is defined between the projection and the internal bevel;

the height of the bearing lip measured at the base of the external bevel is between 6 and 12 mm; and the width of the sole is between 2 and 15 mm.

The invention will be better understood on reading the following description, which is provided only as an example and made in reference to the appended drawings, in which.

Figure 1:
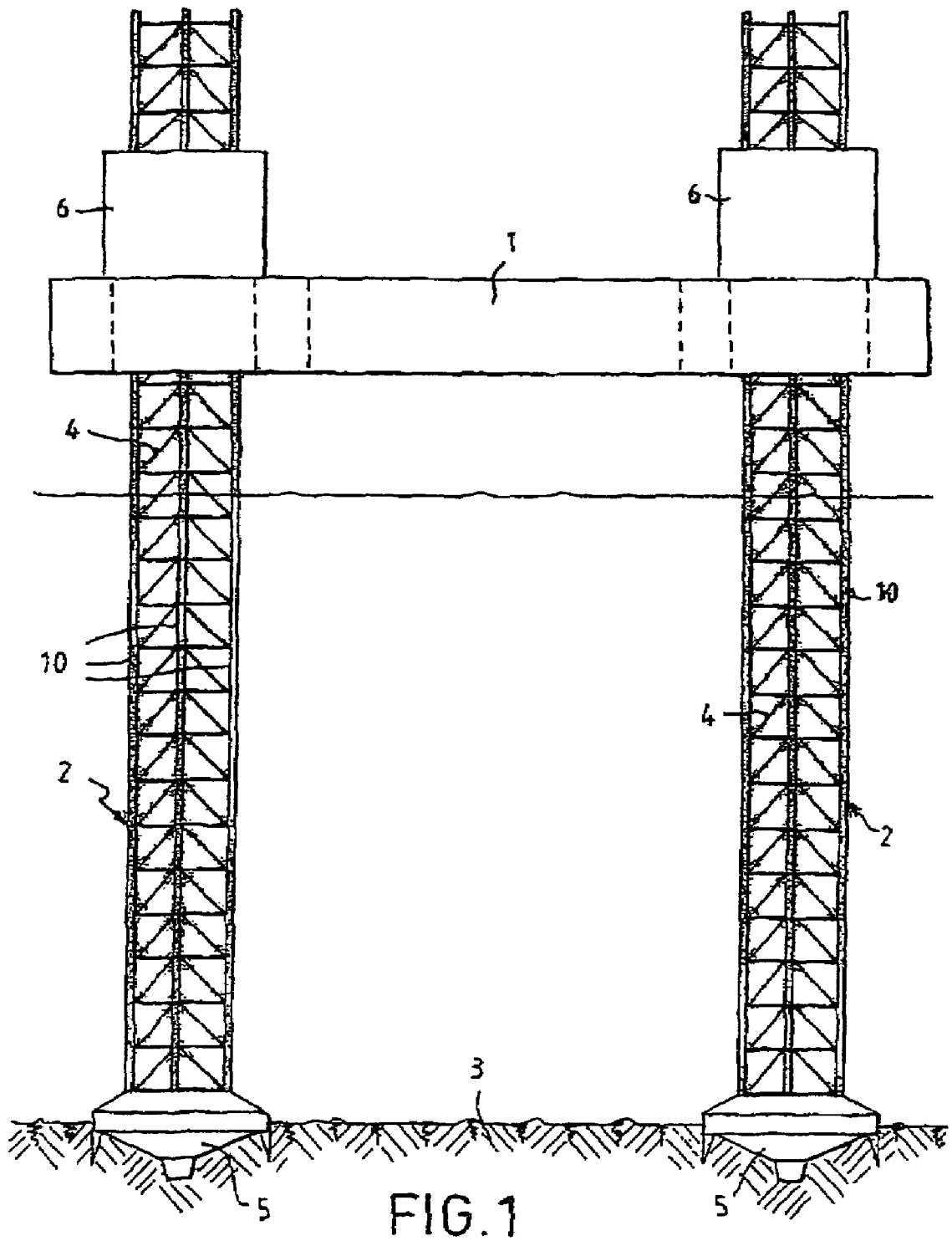
FIG. 1 is a diagrammatic elevation view of an oil platform, for example a jack-up platform.

A jack-up oil platform featuring a hull 1 mounted such that it can move on the vertical legs 2 designed to bear on the seabed 3, when the platform is in a drilling or production position, is diagrammatically represented in FIG. 1.

In the present case, each vertical leg 2 is of triangular section comprising three vertical, parallel members 10 interconnected by a lattice of metal struts 4.

The bottom of each leg 2 features a foot 5.

Moreover, at each leg 2, the platform is equipped with a drive and suspension mechanism 6 for the hull with respect to said legs 2.

Drive mechanisms allow the legs 2 to be lowered into contact with the seabed then, by bearing on the legs, the hull 1 can be raised above sea level up to an elevation that places it outside the range of the highest waves.

Figure 2:
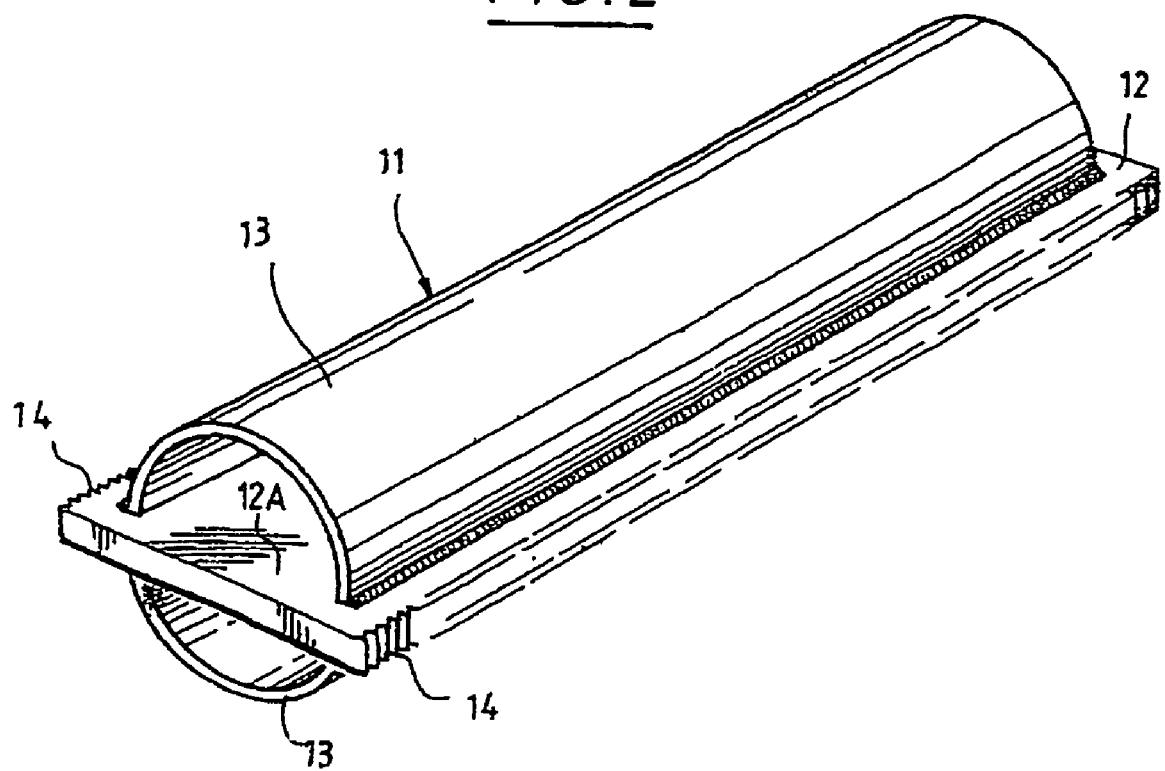
FIG. 2 is a diagrammatic perspective view of a section of a support leg member fabricated by the process according to the invention.

Each member 10 of the legs is made up of several sections 11 of great length: of the order of 12 to 35 meters. Such a section is represented in FIG. 2.

Each section 11 is formed by a rectangular main plate 12 and two stiffeners 13 in the shape of half-shells, each welded onto one main surface 12A of said rectangular plate 12.

The lateral edges of the rectangular plate 12 incorporate teeth 14 to form, on the member 10, two diametrically opposite racks designed to operate jointly with the output gears of the drive mechanisms 6, which are not represented.

The thickness of the main plate 12 is between 120 and 220 mm.

Figure 3:
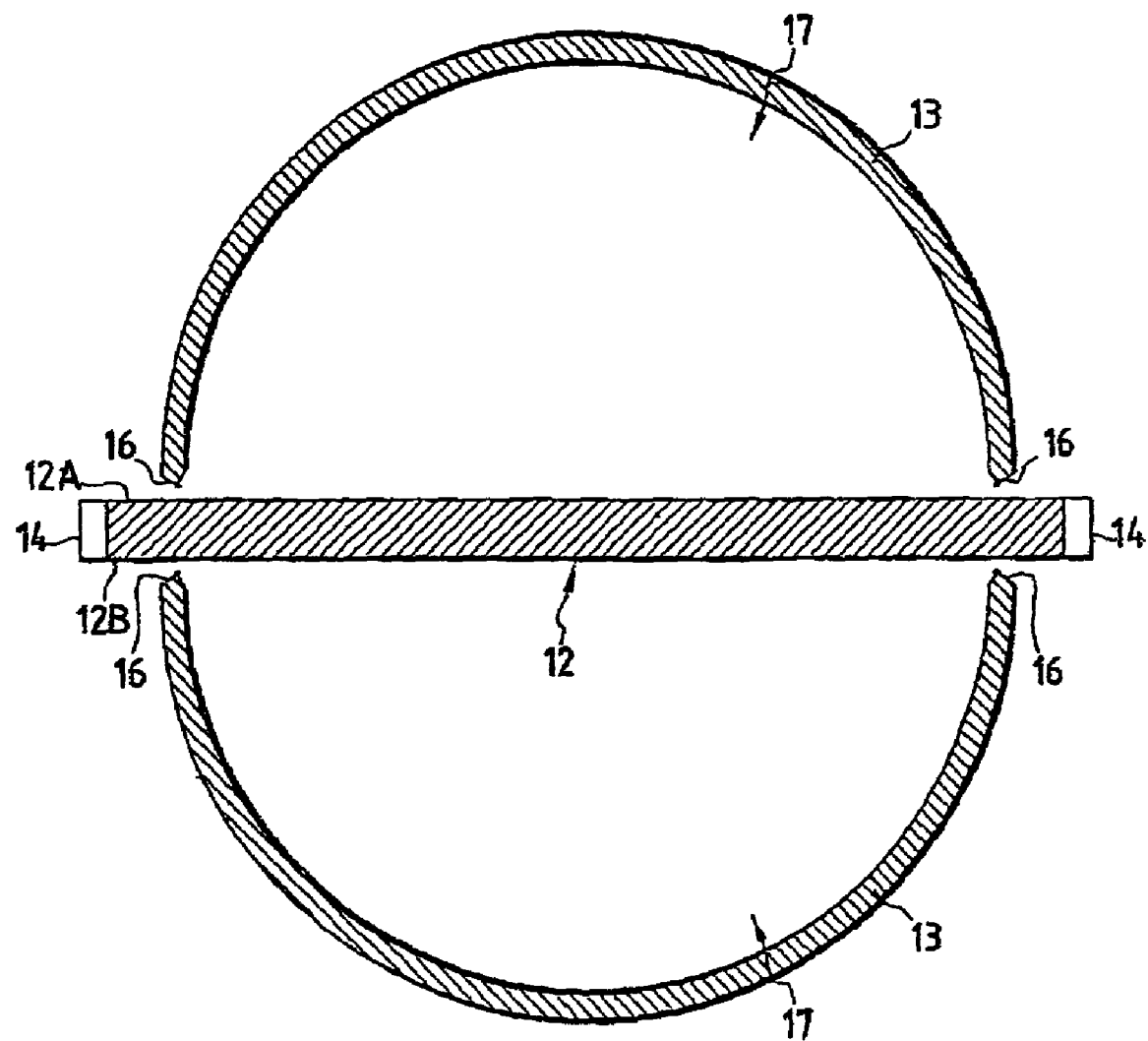
FIG. 3 is an exploded sectional view of a main plate and two stiffeners before assembling these components.

The assembly of a section 11 of member 10 using the process according to the invention will now be described in reference to FIG. 3 and subsequent figures.

The stiffeners 13 are of semicylindrical shape and more specifically in the shape of half-cylinders in the envisaged method of implementation. The thickness e of each stiffener 13 is between 40 and 120 mm.

The stiffeners 13 are welded onto the main plate 12 along the longitudinal edges 16 running parallel to each other.

The conduit 17 is defined between the plate 12 and each stiffener 13.

Figure 4:
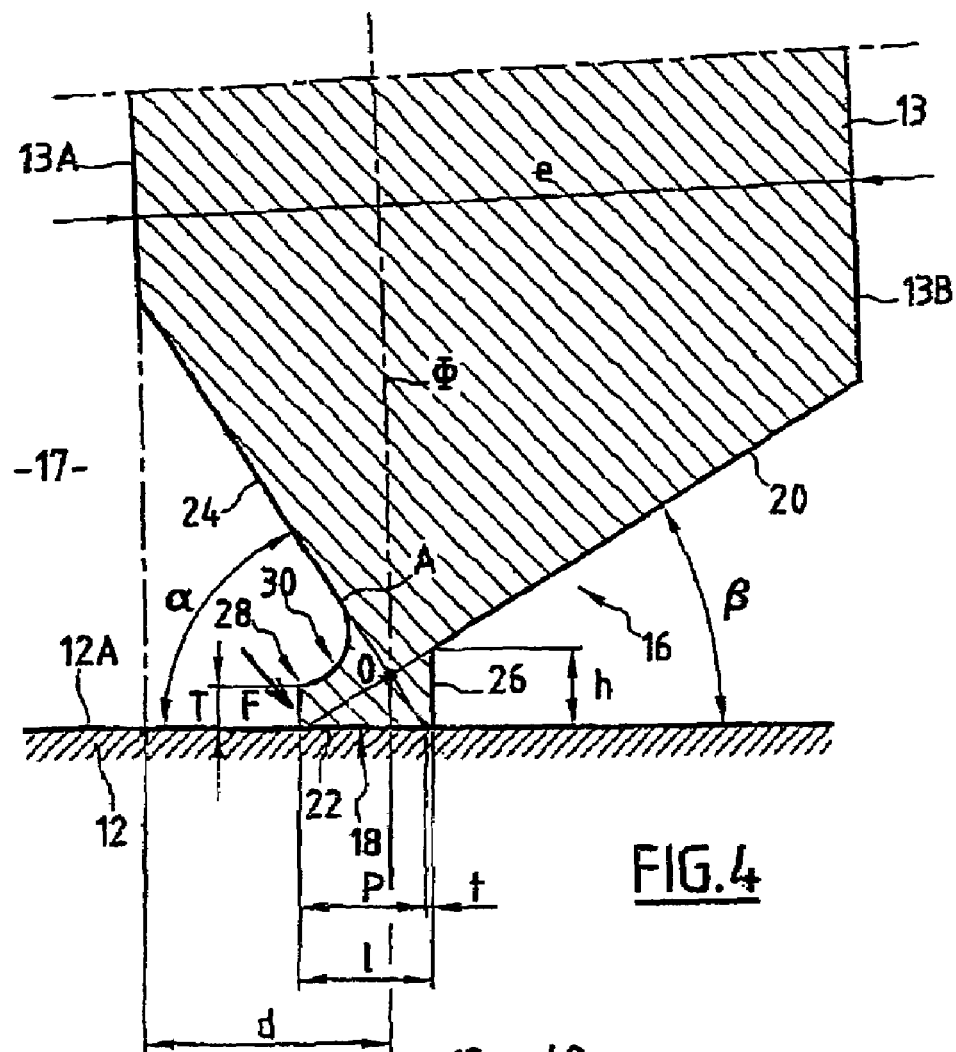
FIG. 4 is a larger scale, diagrammatic sectional view showing a connection zone between a main plate and a stiffener before welding.
Figure 5:
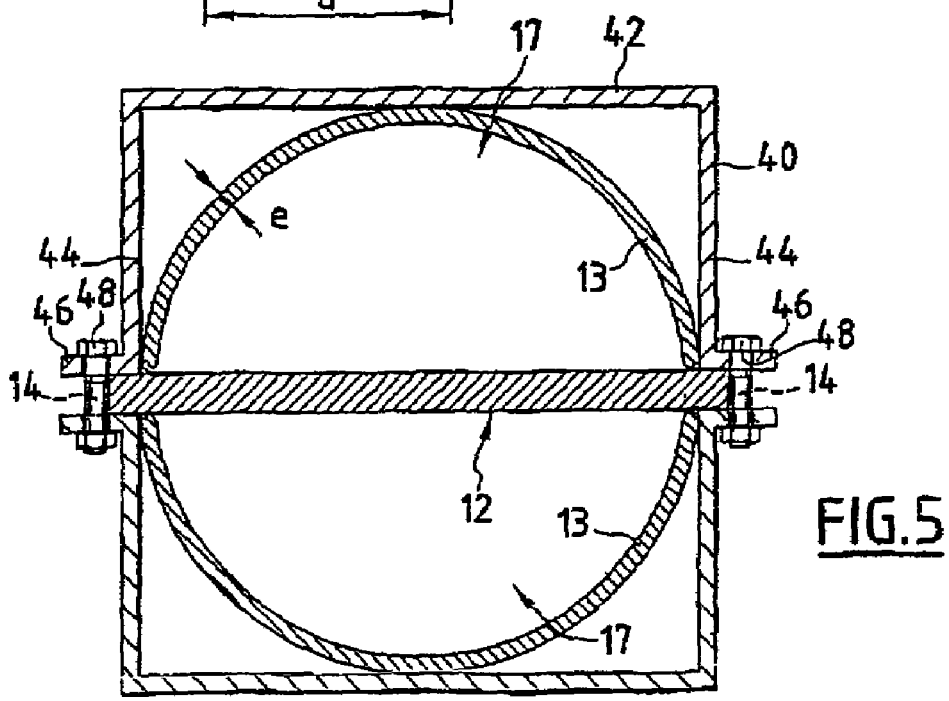
FIG. 5 is a diagrammatic sectional view of the main plate and stiffeners clamped before welding.

As illustrated in FIG. 4, the longitudinal edges 16 of the stiffeners are prepared by machining to give a profile suitable for welding.

In particular, each longitudinal edge 16 is machined to provide a lip 18 for bearing on a main surface 12A of the plate. An external bevel 20 is formed along the edge 16 on the side opposite the conduit 17, between the lip 18 and the external surface 13B of the stiffener.

Advantageously, the lip 18 extends along the full length of the edge 16. This lip 18 defines a flat sole 22 bearing on the main surface 12A of the plate. This sole is machined such that it lies perfectly flat against the main surface 12A during assembly of the stiffener and the plate.

Advantageously, the bearing lip 18 is incorporated within the half of the stiffener 13 thickness e situated on the internal lateral surface side of this stiffener.

More precisely, the distance d separating the stiffener internal general surface 13A from the bearing lip 18 is between 0 and 50% of the thickness e of the stiffener 13, as illustrated in FIG. 4.

Preferably, this distance d is between 20 and 40% of the thickness e of the stiffener 13 and is preferably more or less equal to one third of this thickness.

Within the stiffener 13 projected thickness, offsetting of the bearing lip 18 away from the internal lateral surface 13A is achieved through incorporation of a bevel 24, formed along the edge 13 on the conduit 17 side. This internal bevel 24 is generally straight and defines, with the sole 18 or the main surface 12A, an angle α between 40° and 70° and preferably more or less equal to 55°. On the external side, the bevel 20 formed along the edge 16 defines, with the sole 22 or the plate main surface 12A, an angle β between 20° and 40° and preferably more or less equal to 30°.

The bearing lip 18 is by and large formed at the point of convergence 0 of the two bevels 20 and 24. With respect to these bevels, it projects in the direction defined by the involute φ of the stiffener 13 that passes through the point 0.

More precisely, in section and on the external bevel 20 side, the bearing lip 18 has an external face 26 that extends generally perpendicular to the sole 22 and connects one end of the sole 22 to the bevel 20. The height h of the face 26 is between 6 and 12 mm.

On the conduit 17 side, the bearing lip 18 is tangentially connected to the bevel 24 at a connecting point A. The sole 22 extends beyond the projection of point A on the sole 22 or the main surface 12A to form an internal lateral projection 28.

The denoted minimum height T of this internal lateral projection 28 is between 0 and 8 mm. This projection is connected to the bevel 24 by a concave section 30 forming a channel of semi-circular cross section.

The presence of the internal lateral projection 28 ensures that the sole 22 is offset towards the conduit 17 side with respect to the stiffener involute φ.

In particular, the bearing lip 18 has a general cross section whose shape flares gradually towards the sole 22 on the internal side of the conduit 17.

The width 1 of the sole 22 is between 2 and 15 mm. This width is divided into a width t, corresponding to the distance separating the face 26 from the point of intersection of the internal bevel 24 and the sole 22, and a width P, corresponding to the distance separating the point of intersection of the internal bevel 24 and the sole 22 from the internal end of the sole.

The width t is preferably between 2 and 5 mm, while the width P is between 0 and 10 mm.

To undertake actual connection of a stiffener edge 16 and the main plate 12, the stiffeners are first applied to the two opposite main surfaces 12A of the main plate 12. They are held in position by temporary flanges 40, which clamp the stiffeners 13 against the main surfaces of the plate 12. These flanges are made up of steel sections defining generally a forked shape. These flanges are arranged at regular intervals depending on the length of the member section and are interspaced by a distance of between 3 and 5 meters.

These flanges are dimensioned such that the bottom section denoted 42 and the lateral sections denoted 44 bear against the mid-section of each stiffener 13 and the flanks, in the immediate vicinity of the edges 16 to be welded, respectively. The sides of each flange feature brackets 46, capable of pressing against the edges of the main plate 12 in the area where teeth 14 are formed. The bolts 48 are inserted in the corresponding holes drilled through the brackets 46, ensuring connection of the two flanges each located on one side of the plate 12. The bolt shanks extend between the teeth 14.

Clamping of the flanges by the bolts inserted between the teeth 14 ensures that the stiffeners 13 are held in position prior to welding.

The edge 16 of each stiffener is first welded, without introducing filler metal, by heating the bearing lip 18 and the associated main surface 12A of the plate from inside the conduit 16. This heating and melting of the bearing lip is performed, for example, by TIG welding or by plasma welding and its variants, in other words by inert gas nonconsumable-electrode arc welding without filler metal.

Figure 6:
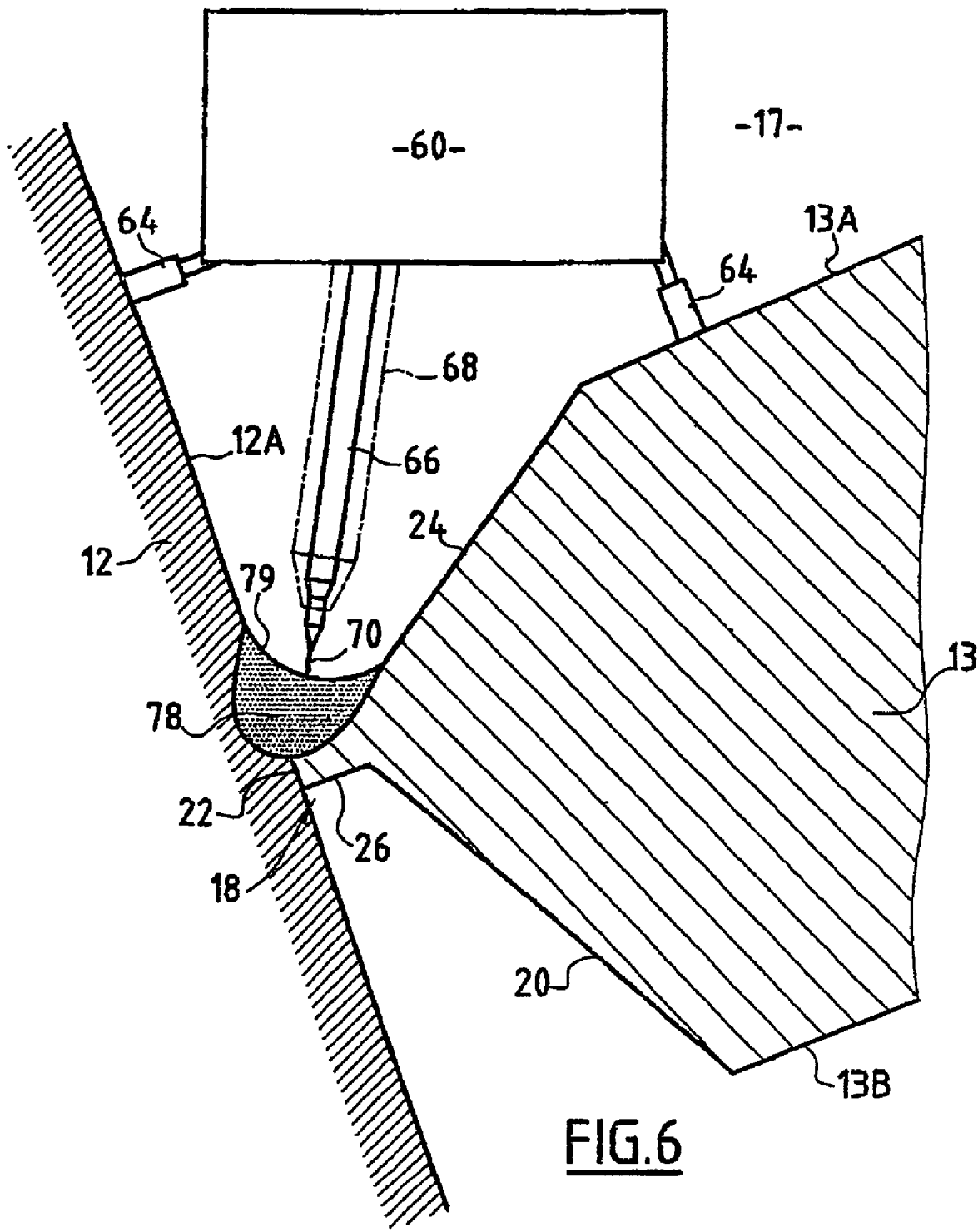
FIGS. 6 and 7 are larger scale, sectional views of the connection zone between a main plate and a stiffener during the initial welding phase.

For this purpose, according to a first method of implementation of the invention shown in FIG. 6, the section of member to be welded is arranged such that the bisector of the general angle defined between the main surface 12A and the bevel 24 extends more or less vertically.

A self-propelled trolley 60 fitted with an observation camera and guidance means is introduced into the conduit 17. The trolley 60 is fitted with rollers 64, which bear on the internal lateral surface 13A of the stiffener and on the plate main surface 12A.

Moreover, the trolley carries a nonconsumable-electrode welding electrode 66 enclosed in a tube 68 supplying inert gas such as welding gas (argon or helium) mixtures. The electrode 26 is held at distance from the bearing lip 18 such that an electric arc 70 is created between the electrode and the corner defined by the bearing lip 18 and the plate 12, a potential difference being applied between the section of member to be welded and the electrode 26.

Preferably, the arc is created in the immediate vicinity of the intersection of the main surface 12A and the bearing lip 18, this area being shown by the arrow F in FIG. 4.

The temperature rise in the bearing lip 18 causes its constituent metal to melt, at least in the parts of it featuring the internal lateral projection 28 and in contact with the surface 12A.

The lip 18 therefore plays the part of filler metal and, under the action of heat, enables satisfactory weld penetration to be obtained between the stiffener 13 and the plate 12 in the bearing lip region.

Working from inside the conduit 17, welding without filler metal is performed throughout the length of the bearing lip 18 and, in particular, throughout the length of the stiffener 13 if the bearing lip extends over its full length.

Figure 7:
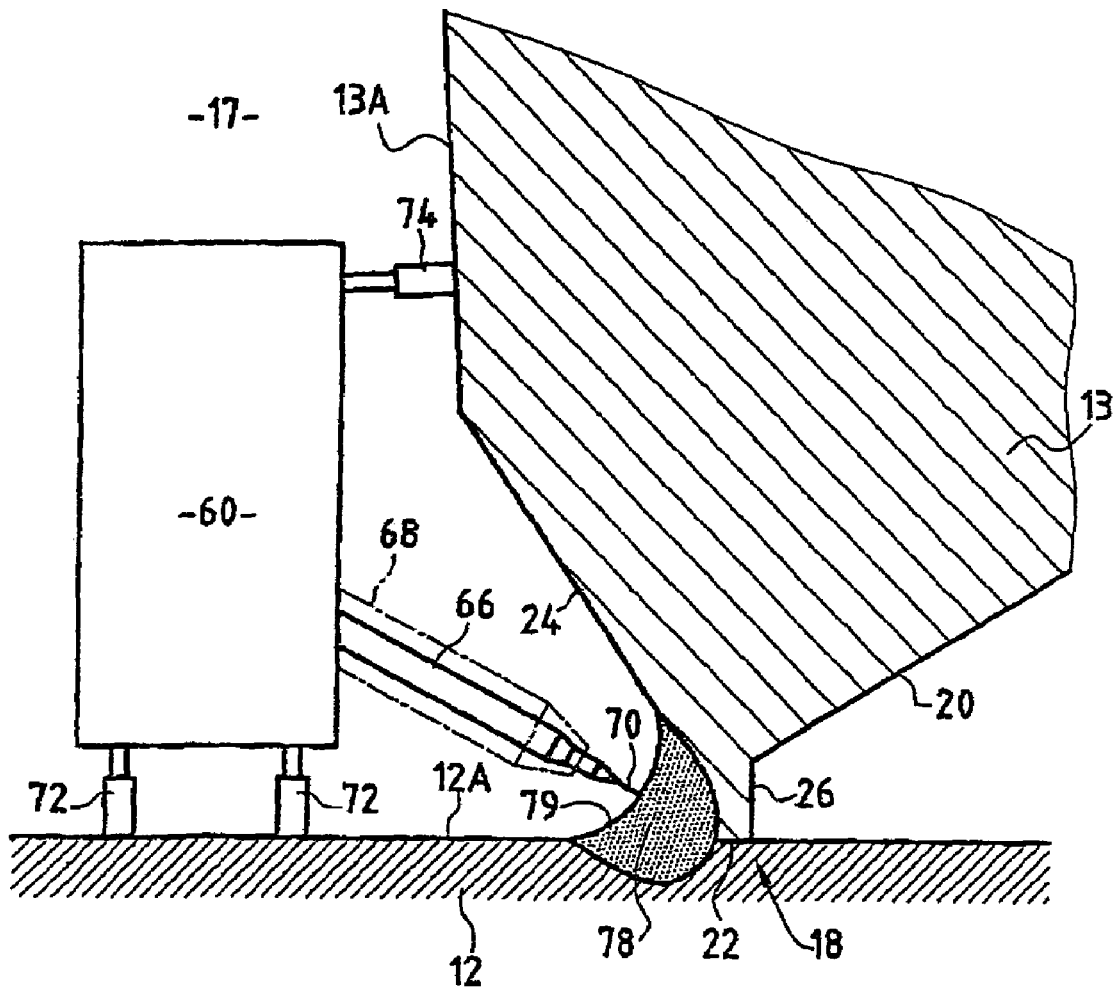

In the alternative method of implementation illustrated in FIG. 7, the member is positioned such that the plate 12 lies with its main surface 12A generally horizontal. The self-propelled trolley 60 rolls along this surface on wheels 72 and positions itself with respect to the stiffener 13 by means of a lateral guide roller 74. In this implementation method also, the self-propelled trolley moves the electrode 66 along the length of the bearing lip 18 to create an electric arc 70, ensuring melting of the internal part of the bearing lip.

It is noted that in the two alternative methods of implementation of the process, the internal lateral projection 28, associated with initial curvature of the concave section 30, gives a weld 78 ensuring connection of the main surface 12A and the bevel 24 that features a curved external profile 79 generally linked tangentially, on the one hand, to the bevel 24 and, on the other hand, to the main surface 12A.

Figure 8:
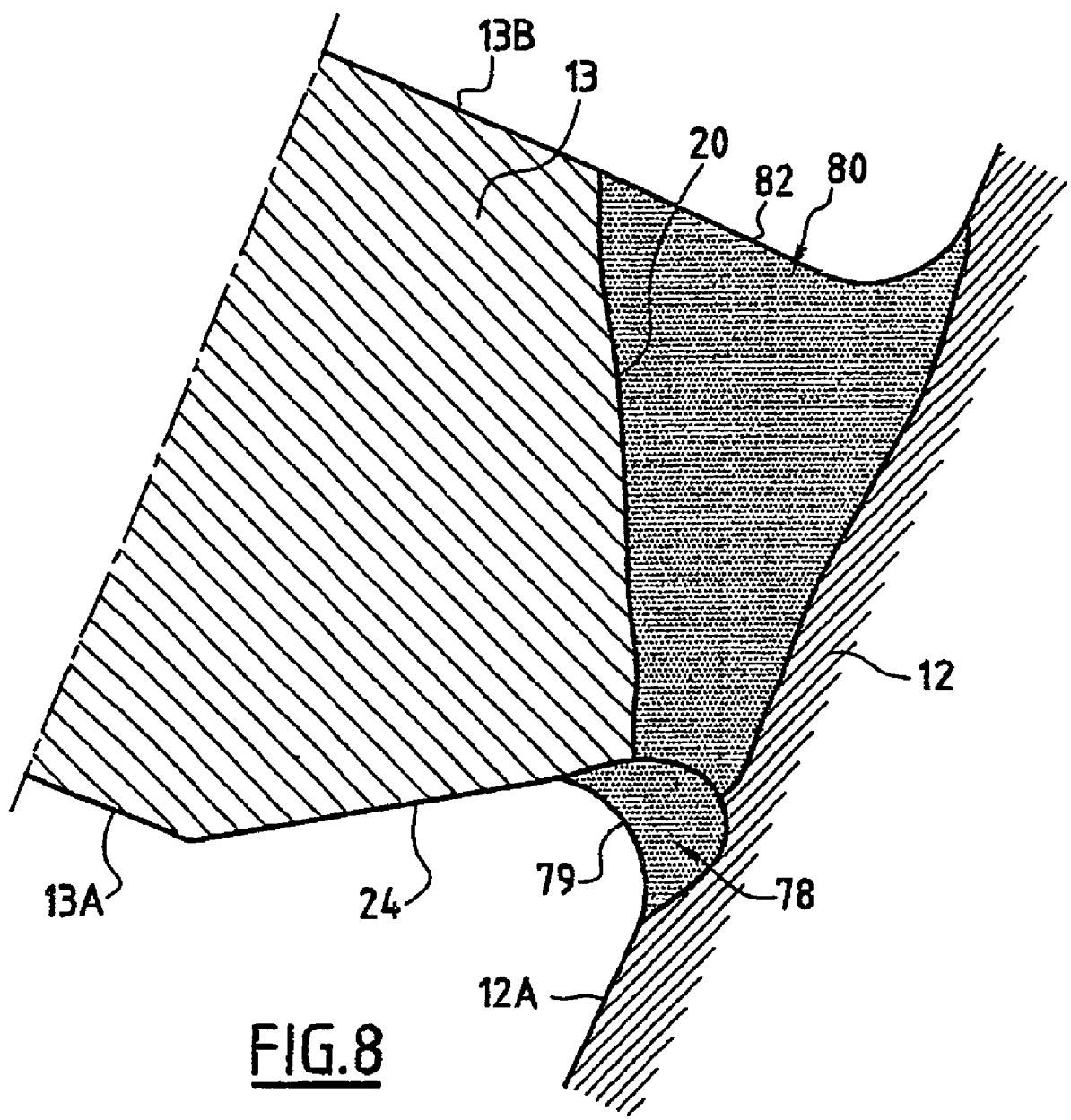
FIG. 8 is a larger scale, sectional view of a connection zone between a rectangular plate and a stiffener after implementing the process according to the invention.

After internal welding without filler metal, the clamping flanges 40 are removed and the space defined between the bearing surface 12A and the external bevel 20 is filled with an external weld bead 80, as shown in FIG. 8. The weld 78 is used as a backing for the first external weld passes.

This weld bead is obtained by automatic flux welding using a process known in itself.

The filler metal used for forming the weld bead 80 is such that the bead 80 fills completely and accurately the space defined between the main surface 12A and the external bevel 20, the free surface 82 of the weld extending in the projected external general surface 13B of the stiffener.

When laying down the external weld bead 80, the external part of the bearing lip melts due to heating and is thereby welded to the plate 12, as shown in FIG. 8.

Depending on the thickness of the stiffener, the position of the bearing lip 18 is determined by calculating the forces to be applied to the weld. The width of the weld bead 80 is determined from these forces and the bearing lip position is defined such that the width of the weld bead 80 is equal to the width of weld required to obtain the necessary structural characteristics.

It can be seen that the fatigue strength of the weld is high using such a welding process. Furthermore, implementation of the welding process is relatively easy because no welding with filler metal is performed from inside the conduit 17 and filler metal is only introduced from outside.

The presence of the bearing lip 18 makes welding without filler metal possible from the inside of the conduit.

In an alternative method of implementation to ensure welding without internal filler metal, the self-propelled trolley 60 does not move along the length of the section to be welded inside the space delimited by the stiffener but, on the contrary, outside the space 17, depending on the length of the section. The electrode 66 performing welding is carried at the end of an arm built into the self-propelled trolley and inserted into the space 17 from an open end of this space.

The welding process can be implemented in all positions and, in particular, with the weld to be executed in a vertical configuration.

The invention claimed is:

1. A fabrication process for a section (11) of an offshore oil production platform support leg (2) member (10), the member (10) comprising a main plate (12) incorporating, on at least one longitudinal edge, teeth (14) forming a rack and at least one stiffener of semicylindrical shape welded to a main surface (12A) of the main plate (12) along two longitudinal edges (16), the stiffener (13) and the plate (12) delimiting a conduit (17), wherein it includes the following stages applied to at least one part of the length of the member (10):
 a) machining of each longitudinal edge (16) of the stiffener (13) to form, along the longitudinal edge (16), a lip (18) for bearing on the main surface (12A) of the main plate (12) by forming, along the longitudinal edge (16), an external bevel (20) on the side opposite the conduit (17);
 b) applying a sole (22) of the bearing lip (18) to the main surface (12A) of the plate (12);
 c) heating the bearing lip (18) to ensure its welding to the plate (12) and to form a bearing weld (78); and
 d) with filler metal, forming a weld bead (80) from outside the conduit (17) within the space defined between the bearing weld (78), the external bevel (20) and the main surface (12A) of the main plate (12).

2. The process as claimed in claim 1, wherein the heat supply causing heating of the bearing lip (18) for the purpose of welding it to the plate (12), is ensured from inside the conduit (17).

3. The process as claimed in claim 1, wherein heating of the bearing lip (18) to ensure its welding to the plate (12) is performed without introducing filler metal.

4. The process as claimed in claim 1, wherein heating of the bearing lip (18) to ensure its welding to the plate (12) is performed using an inert gas nonconsumable-electrode arc welding method.

5. The process as claimed in claim 1, wherein it includes a stage, applied to at least one part of the length of the member (10), involving machining of each longitudinal edge (16) of the stiffener (13) to form an internal bevel (24) on this edge, on the side of the bearing lip (18) facing the conduit (17).

6. The process as claimed in claim 1, wherein the weld bead (80) formed from outside the conduit (17) fills completely the space defined between the main surface (12A) of the plate, the external bevel (20) and the bearing lip (18).

7. The process as claimed in claim 1, wherein the bearing lip (18) is incorporated within the half of the stiffener (13) thickness (e) situated on the internal conduit (17) side.

8. The process as claimed in claim 1, wherein the distance (d) separating the stiffener internal lateral surface (13A), defined on the conduit (17) side, from the bearing lip (18) is between 20 and 40% of the stiffener (13) thickness (e).

9. The process as claimed in claim 1, wherein the bearing lip (18) features an internal lateral projection (28) on the conduit (17) side near to its sole (22).

10. The process as claimed in claim 9, wherein the minimum height (T) of the projection (28) is between 0 and 8 mm.

11. The process as claimed in claim 6, wherein the bearing lip (18) features an internal lateral projection (28) on the conduit (17) side near to its sole (22) and wherein a hollow profile (30) is defined between the projection (28) and the internal bevel (24).

12. The process as claimed in claim 1, wherein the height (h) of the bearing lip (18) measured at the base of the external bevel (20) is between 6 and 12 mm.

13. The process as claimed in claim 1, wherein the width of the sole (22) is between 2 and 15 mm.

* * * * *